(No Model.)
J. MURREY.
OBSERVATION WHEEL.
No. 506,828. Patented Oct. 17, 1893.
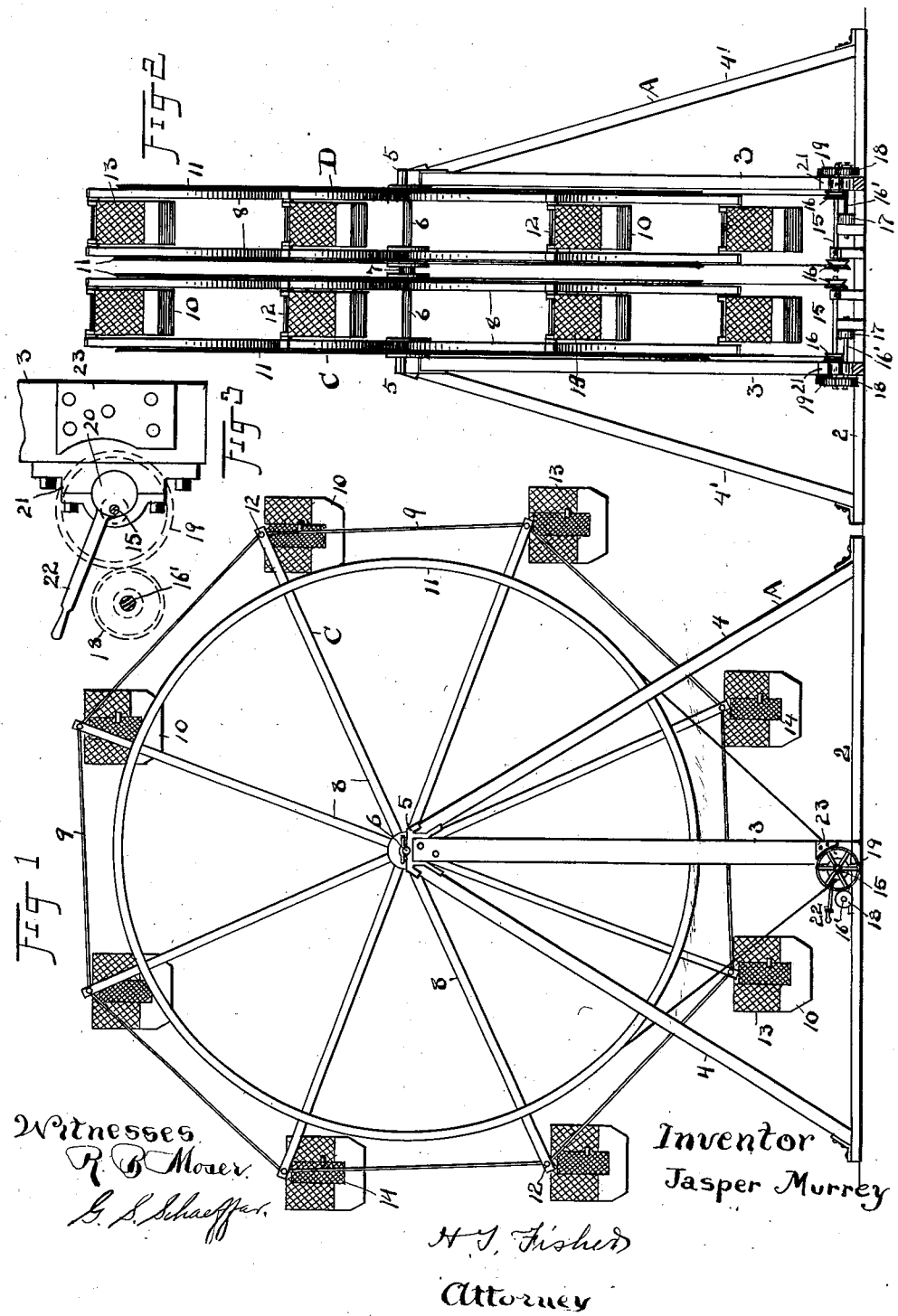
Witnesses
R. B. Moser.
G. S. Schaeffer.
Inventor
Jasper Murrey
H. J. Fisher
Attorney

UNITED STATES PATENT OFFICE.

JASPER MURREY, OF CLEVELAND, OHIO, ASSIGNOR OF TWO-THIRDS TO S. W. WATTERSON AND GEORGE F. McKAY, OF SAME PLACE.

OBSERVATION-WHEEL.

SPECIFICATION forming part of Letters Patent No. 506,828, dated October 17, 1893.

Application filed February 11, 1893. Serial No. 461,988. (No model.)

*To all whom it may concern:*

Be it known that I, JASPER MURREY, a citizen of the United States, residing at Cleveland, in the county of Cuyahoga and State of Ohio, have invented certain new and useful Improvements in Observation-Wheels; and I do hereby declare that the following is a full, clear, and exact description of the invention, which will enable others skilled in the art to which it appertains to make and use the same.

My invention has reference to observation wheels, and the invention consists in the construction and combination of parts therein, substantially as shown, described, and particularly pointed out in the claim.

In the accompanying drawings, Figure 1 is a side elevation of my improved structure, and Fig. 2 is an edge elevation thereof with the braces 4 removed and the base in cross section. Fig. 3 is an enlarged side elevation of the friction brake mechanism with the friction wheel removed, but its position shown in dotted lines.

A represents the frame or frame-work of the structure. This frame is composed of several parts. These parts consist in a suitable base 2, a central post 3 on each side of the structure, endwise inclined braces 4 running from the outer portion of the base inward and upward to the top of posts 3 (Fig. 1), and sidewise braces 4' (Fig. 2) also extending to the top of posts 3.

In the present instance I show suitable brackets 5 fixed rigidly to the tops of the posts 3 and having sockets in their sides for the ends of the braces 4 and 4'. The frame thus formed upon both sides of the structure is made perfectly rigid and as strong as the operation of the machine requires, and each side thereof is complete in itself so far as strength and means of supporting the wheel are concerned. The bracket 5 has a seat or rest for the wheel shaft 6, and the said shaft serves for both the wheels C and D. A cap 6' fastens the end of the shaft rigidly upon its seat or rest. These two wheels are adapted to turn upon the said shaft 6, and each wheel turns thereon independently of the other. A suitable sleeve 7 separates the wheels on the shaft. The wheels C and D are constructed alike, and each has a series of radial arms or spokes 8 connected at their ends by the bracing and connecting rods 9, running directly from the extremity of one spoke or arm to the other in both directions and these braces are opposite the pivot points of the cars or baskets 10 where the strain on the spokes occurs. In from the ends of the said spokes and fixed on the same and serving further as a brace is the ring shaped sheave 11 over which the drive cable passes.

Each wheel has two sets of spokes and braces as described, and the pivot axles or shafts 12 upon which the baskets are suspended cross connect said spokes or arms in each wheel. The baskets or cars 10 are suspended from these cross axles or supports 12 between the spokes of the respective wheels, and are so constructed and arranged and supported upon the said axles 12 that under all circumstances they will turn freely thereon, whatever their position upon the wheel in ascending or descending, and that their sides will be absolutely free at all times from any engagement or accidental locking whatever with the spokes 8, or the sheave 11, or the cross rods or ties 9. This is necessary to make the wheel safe for the carrying of passengers, as otherwise it might occur that the carriage 10 would catch on some one of these several parts and, in the turning of the wheel, be upset to the injury of the passengers. However, I provide against spilling the passengers out of the carriage by inclosing the said basket about its side with wire netting 13, or its equivalent, of sufficient strength for all purposes, and covering the top as well with open or closed material, and an openwork door 14 adapted to be locked when the passengers are in and which forms an entrance thereto. Hence, when the wheel is rotated and each carriage in its order ascends and descends, it is made absolutely safe for the occupants from all really serious injury, and the worst that could possibly happen would be the turning over or inversion of the carriage upon its bearings. But this is absolutely prevented by the construction shown.

Each wheel is separately rotated from a separate drive shaft 15 having grooved wheels 16 thereon and provided with wire cables, or the like, which pass over the large grooved ring sheave 11 on the main wheel. Power is applied to these shafts 15 independently of each other so that the two wheels may be rotated at the same time or they may be rotated alternately upon the same shaft. Usually, one is engaged in loading while the other is traveling.

The shaft 16' has a pulley 17 at one end and a friction wheel 18 at the other. This shaft and friction wheel can be in constant motion if so desired. The friction wheel 18 is engaged by a larger friction wheel 19 rigidly fastened with the shaft 15. This shaft 15 is eccentrically fastened in a disk or wheel 20 in the box 21. The shaft is free to revolve in the disk 20, and has a pinched sheave 16 fastened at its opposite end. The handle 22 is rigidly connected with the disk 20, and when lifted it turns the disk in its box. By having the shaft 15 eccentric to the center of the disk, it lifts the friction wheel 19 out of engagement with wheel 18 and carries it over and against the brake block 23. The observation wheel is started again by letting the handle down and thereby bringing the friction wheels in contact again.

Having thus described my invention, what I claim is—

In combination, an observation wheel having a pulley 11 secured thereto, the shaft 15 having pulley 16, an endless band passing around said pulleys, a movable bearing for one end of shaft 15, the friction wheel 19 on said shaft, a friction driving wheel 18, the stationary friction block 23, the wheel 18 and block 23 being arranged so that the wheel 19 may be shifted from one to the other, and means independent of said block and wheel 18 for shifting the movable bearing, substantially as and for the purpose described.

Witness my hand to the foregoing specification.

JASPER MURREY.

Witnesses:
H. T. FISHER,
GEORGIA SCHAEFFER.